United States Patent
David et al.

(10) Patent No.: US 12,455,105 B2
(45) Date of Patent: Oct. 28, 2025

(54) ARTIFICIAL SNOW-MAKING FACILITY

(71) Applicant: TECHNOALPIN FRANCE, Dardilly (FR)

(72) Inventors: Eric David, Treillieres (FR); Maël Vervoitte, Carquefou (FR); Gaël Lesage, Bourgneuf en Retz (FR); Markus Pfeifer, Deutschnofen (IT); Damien Landreau, Mlledieu la Blouere (FR)

(73) Assignee: TECHNOALPIN FRANCE, Dardilly (FR)

( * ) Notice: Subject to any disclaimer, the term of this patent is extended or adjusted under 35 U.S.C. 154(b) by 833 days.

(21) Appl. No.: 17/374,124

(22) Filed: Jul. 13, 2021

(65) Prior Publication Data
US 2022/0018583 A1    Jan. 20, 2022

(30) Foreign Application Priority Data
Jul. 15, 2020  (FR) ...................................... 2007392

(51) Int. Cl.
*F25C 3/04* (2006.01)
*F03D 9/20* (2016.01)

(52) U.S. Cl.
CPC ................. *F25C 3/04* (2013.01); *F03D 9/20* (2016.05); *F25C 2303/044* (2013.01); *F25C 2303/0481* (2013.01)

(58) Field of Classification Search
CPC .............. F25C 3/04; F25C 2303/044; F25C 2303/0481; F03D 9/20; F05D 2260/602; F01D 25/32

USPC ....................................... 239/14.2; 415/169.2
See application file for complete search history.

(56) References Cited

U.S. PATENT DOCUMENTS

| | | | | |
|---|---|---|---|---|
| 976,109 A | * | 11/1910 | Wellman | F04D 1/063 415/224 |
| 2,368,033 A | * | 1/1945 | Makaroff | F03B 1/00 415/149.1 |
| 3,945,567 A | * | 3/1976 | Rambach | F04F 5/466 239/14.2 |

(Continued)

FOREIGN PATENT DOCUMENTS

| DE | 10 2009 004 738 | 9/2010 |
|---|---|---|
| EP | 0 089 590 | 9/1983 |

(Continued)

OTHER PUBLICATIONS

Machine Translation of JP-H04-116361-A Description, Espacenet, Translated Jul. 2024, pp. 1-2 (Year: 2024).*

(Continued)

*Primary Examiner* — Arthur O. Hall
*Assistant Examiner* — Kevin Edward Schwartz
(74) *Attorney, Agent, or Firm* — NIXON & VANDERHYE (57) ABSTRACT

An artificial snow-making facility includes: a snow-making device; a fluidic water pipe for supplying water to the snow-making device; potentially, a fluidic air pipe for supplying air to the snow-making device; a controller for managing the operation of the snow-making device; and a power supply for supplying electricity to the controller. The power supply includes a power generator arranged on one of the fluidic pipes, which power generator includes a turbine adapted to be driven by the fluid of the fluidic pipe.

9 Claims, 3 Drawing Sheets

(56) References Cited

U.S. PATENT DOCUMENTS

| | | | |
|---|---|---|---|
| 4,442,682 A | 4/1984 | Sakata et al. | |
| 4,597,524 A * | 7/1986 | Albertsson | F25C 3/04 239/14.2 |
| 5,119,624 A | 6/1992 | Mckenna | |
| 5,471,965 A * | 12/1995 | Kapich | F03B 1/00 123/565 |
| 5,752,383 A | 5/1998 | Rominek | |
| 6,935,575 B2 * | 8/2005 | Lacchia | B05B 12/00 239/69 |
| 8,228,031 B2 * | 7/2012 | Alameh | F03B 13/00 320/115 |
| 8,453,999 B2 * | 6/2013 | Kapich | A62C 31/02 261/28 |
| 9,334,758 B2 | 5/2016 | Archambeault et al. | |
| 9,429,349 B2 * | 8/2016 | Meneuvrier | B05B 12/04 |
| 9,599,390 B2 * | 3/2017 | Galvin | F25C 3/04 |
| 2010/0045233 A1 | 2/2010 | Alameh et al. | |
| 2011/0266702 A1 | 11/2011 | Kapich | |
| 2014/0360190 A1 * | 12/2014 | Archambeault | F01D 25/32 60/657 |
| 2015/0211387 A1 * | 7/2015 | Shioyama | G05D 7/03 137/872 |
| 2018/0238226 A1 * | 8/2018 | Wang | F02B 37/025 |

FOREIGN PATENT DOCUMENTS

| | | |
|---|---|---|
| IT | VR20120184 | 3/2014 |
| JP | S55-7937 | 1/1980 |
| JP | H04-116361 | 4/1992 |
| WO | 92/08936 | 5/1992 |

OTHER PUBLICATIONS

Machine Translation of DE-10-2009-004738 A1 Description, Espacenet, Translated Jul. 2024, pp. 1-3 (Year: 2024).*

French Search Report for 2007392 dated Mar. 25, 2021, 2 pages.

* cited by examiner

ARTIFICIAL SNOW-MAKING FACILITY

CROSS-REFERENCE TO RELATED APPLICATIONS

This application claims priority to FR2007392 filed Jul. 15, 2020, the entire contents of each of which are hereby incorporated by reference.

TECHNICAL FIELD OF THE INVENTION

The present invention generally relates to the making of artificial snow (also called culture snow).

In particular, it relates to an artificial snow-making facility comprising a snow-making device, a fluidic water pipe for supplying water to said snow-making device, potentially a fluidic air pipe for supplying air to said snow-making device, control means for managing the operation of said snow-making device, and a power supply for supplying electricity to said control means.

STATE OF THE ART

Ski slopes are designed to receive in particular natural snow, for example for the practice of downhill or cross-country skiing.

Generally, it is known to make artificial snow for use on ski slopes in order to compensate for lack of natural snow.

It is then known to install, on at least a portion of the ski slope sides, snow-making devices (also called "snow-production devices" or "snow guns") supplied by pressurized water pipes and potentially pressurized air pipes for making this artificial snow.

These snow-making devices may be of the low-pressure (or "fan") type, or also of the high-pressure (or "hose") type.

Artificial snow making hence requires water and sometimes air.

The quality (dry, normal, wet) of the produced snow is function of the volume of water (and potentially air) sprayed in the outside environment that turns into snow by natural freezing.

This quantity of water, and potentially air, is controlled and managed by systems called "water dispersers", "air dispensers" or "water and air dispensers", which supply water and potentially air to snow-making nozzles fitted on the head of the snow-making devices.

These dispensers may be made from automatic control valves, on/off valves, manual valves . . . or any other system making it possible to adjust a volume of water or, potentially, a volume of air.

To operate a snow-making device, it is hence necessary to have water, and potentially air at disposal, but also a power source for controlling and managing these "water and/or air dispensers".

In the major part of the cases, this power is of the electrical type and comes from an electrical power network via suitable cables.

This electrical energy is mainly used to power the electronics, sensors, actuators, motors or servo-motors, as well as the heater of the snow-making devices.

However, in some cases, it is not possible to bring power grid to each snow-making device.

The snow-making devices that are not connected to the grid must then be self-sufficient in electrical energy, this electrical energy being produced by battery systems, solar panels (use of solar energy) or also wind turbines (use of wind energy).

But the autonomous electricity production means known to date are relatively complex and require regular maintenance.

The battery systems have reduced performance in cold environment and require maintenance (charging, replacement . . . ). The solar panels must be heated to avoid being covered with snow and hence becoming non-operational.

DISCLOSURE OF THE INVENTION

In order to remedy the above-mentioned drawbacks of the state of the art, the present invention proposes an artificial snow-making facility comprising—a snow-making device, —a fluidic water pipe for supplying water to said snow-making device, —potentially, a fluidic air pipe for supplying air to said snow-making device, —control means for managing the operation of said snow-making device, —a power supply for supplying electricity to said control means, wherein said power supply comprises a power generator arranged on one of said fluidic pipes, said power generator comprising a turbine adapted to be driven by the fluid of said fluidic pipe.

Such a facility structure has for advantage to use the energy of the resources necessary for producing snow to ensure the operation of the snow-maker. It does not require to use another source of energy. The system is only mechanical and requires no maintenance, no charging or no cleaning, as the known solutions based on solar panels or batteries.

Other non-limitative and advantageous features of the artificial snow-making facility according to the invention, taken individually or according to all the technically possible combinations, are the following:

- the artificial snow-making facility comprises a power generator arranged on the fluidic water pipe;
- the artificial snow-making facility comprises a power generator arranged on the fluidic air pipe; in this case, the facility preferably comprises two condensate draining systems placed upstream and downstream, respectively, from the power generator, adapted to limit the accumulation of water in the power generator;
- the facility comprises a power generator arranged on the fluidic water pipe and a power generator arranged on the fluidic air pipe;
- the axis of the power generator turbine is meshed with an alternator for the production of electricity, said alternator being connected to means for storing the electrical energy produced, such as batteries or super-capacitors;
- the facility comprises a regulation device adapted to regulate the electrical energy produced;
- the control means for managing the operation of the snow-making device comprise at least one sensor of parameter(s) chosen among wind speed, water pressure, air pressure, ambient temperature and ambient humidity sensors, said at least one parameter sensor being supplied with electrical energy produced by the power generator;
- the power generator comprises a fluid inlet for the driving fluid of the turbine, at least one fluid outlet for the driving fluid of said turbine, a transport canal for said fluid, connecting said fluid inlet and said at least one fluid outlet, within a section of which transport canal is arranged a sector of said turbine, to allow the rotational driving thereof, said transport canal comprising a passage restriction means for said fluid, arranged upstream from said turbine, to increase the speed of said fluid in said transport canal;

the power generator comprises a fluid inlet for the driving fluid of said turbine, at least one fluid outlet for the driving fluid of said turbine, a transport canal for said fluid, connecting said fluid inlet and said at least one fluid outlet, within a section of which transport canal is arranged a sector of said turbine, to allow the rotational driving thereof, said transport canal comprising a passage restriction means for said fluid, arranged downstream from said turbine, to limit the speed of said fluid in the fluid transport canal of the power generator;

the power generator comprises a fluid inlet for the driving fluid of said turbine, at least one fluid outlet for the driving fluid of said turbine, a transport canal for said fluid, connecting said fluid inlet and said at least one fluid outlet, within a section of which transport canal is arranged a sector of said turbine, to allow the rotational driving thereof, and the facility further comprises a "by-pass" pipe that connects said fluid inlet to said at least one fluid outlet, said "by-pass" pipe allowing the passage of a part of said fluid for supplying said snow-making device without transiting through said power generator;

the power generator comprises an inlet for the driving fluid of said turbine, two outlets for the driving fluid of said turbine, a transport canal for said fluid, connecting said fluid inlet and said two fluid outlets, a first one of said fluid outlets being arranged in such a way that a first sector of said turbine is arranged within a section of said transport canal, and a second one of said fluid outlets being arranged in such a way that a second sector of said turbine is arranged within a section of said transport canal, said first turbine sector and second turbine sector extending over angular sectors of different values to offer a choice of connection in particular as a function of the fluid pressure and flow rate characteristics upstream from said power generator, the facility also comprising a closing means adapted to close said first fluid outlet, or said second fluid outlet, not used for the connection.

Of course, the different features, alternatives and embodiments of the invention can be associated with each other according to various combinations, insofar as they are not incompatible with each other or exclusive from each other.

DETAILED DESCRIPTION OF THE INVENTION

Moreover, various other features of the invention emerge from the appended description made with reference to the drawings that illustrate non-limitative embodiments of the invention, in which.

It is to be noted that, in these figures, the structural and/or functional elements common to the different alternatives can be denoted by the same references.

Figure 1:
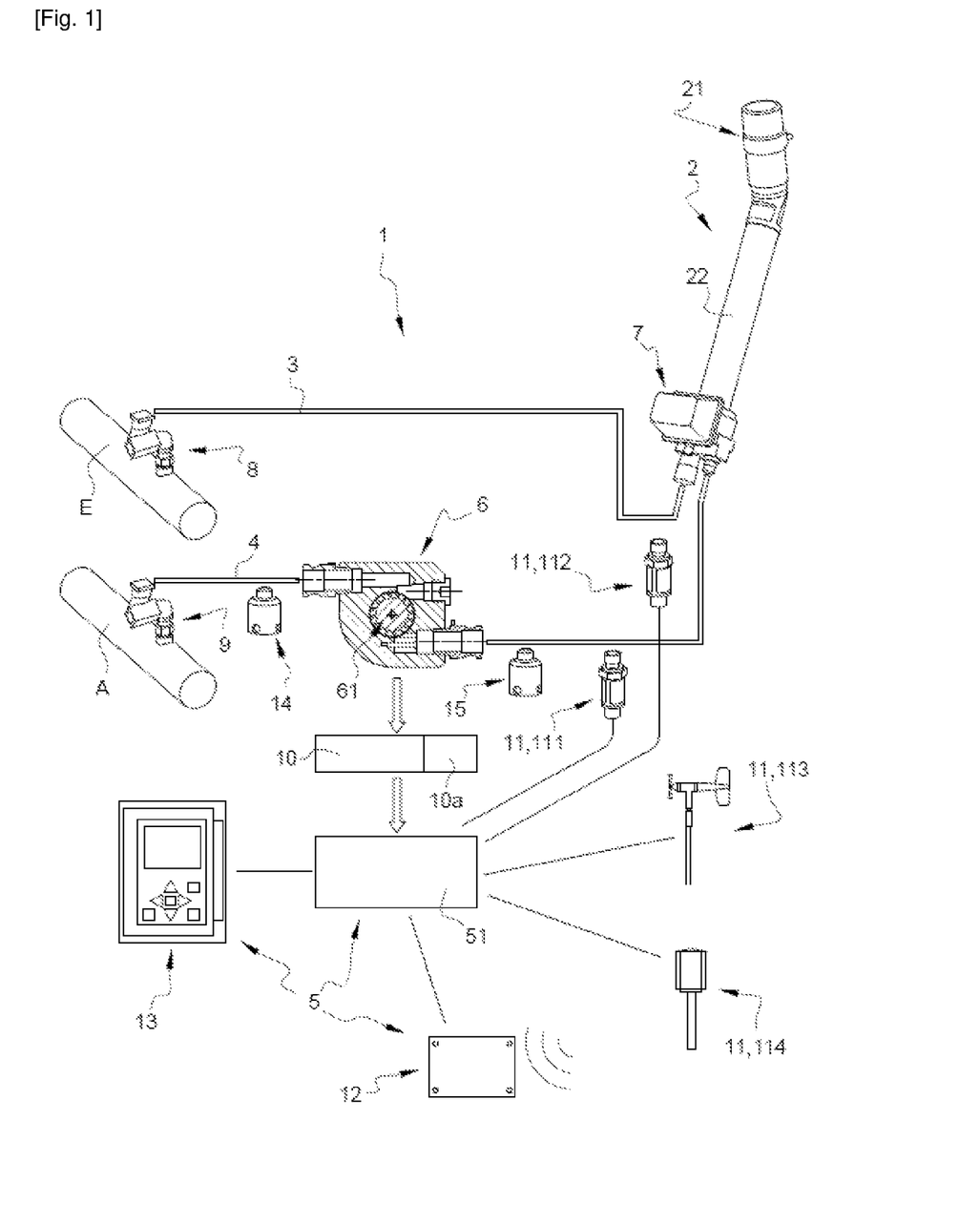
FIG. 1 is a general schematic view illustrating a first embodiment of an artificial snow-making facility according to the invention, comprising a power generator arranged on the fluidic air pipe that supplies the snow-making device.

FIG. 1 illustrates an artificial snow-making facility 1 according to the invention, comprising:
  a snow-making device 2,
  a fluidic water pipe 3 (pressurized water) for supplying water to the snow-making device 2,
  a fluidic air pipe 4 (compressed air) for supplying air to the snow-making device 2,
  control means 5 for managing the operation of the snow-making device 2,
  a power generator 6 for producing electricity and supplying electricity to the control means 5; this power generator 6 is herein arranged on the fluidic air pipe 4, and comprises a blade turbine 61 adapted to be driven by the air fluid of said fluidic air pipe 4.

The snow-making device 2 may be of any type, in particular of the low- or high-pressure type.

In the illustrated embodiment, the snow-making device 2 is of the high-pressure type with external air/water mixture, provided with water spraying nozzles and at least one nucleation agent production nozzle.

The snow-making head 21 of the snow-making device 2 is mounted at the end of a pole 22 that may reach several meters high.

A case 7 enclosing the control means 5 is mounted at the base of the pole 22. The case 7 encloses in particular one or several dispensers actuated by motors (piston system) or by solenoid valves for the regulation of the snow-maker.

The fluidic water pipe 3 is connected to a main water pipe E that runs along the ski slope, preferably for supplying several snow-making devices. A manual valve 8 (called water valve 8) allows an operator to supply the fluidic water pipe 3 from the main water pipe E, or to stop this supply. The water pressure in the fluidic water pipe 3 can be between 3 bar and 100 bar; and the water flow rate can be between entre 0.1 $m^3$/h and 50 $m^3$/h.

Similarly, the fluidic air pipe 4 is connected to a main air pipe A that runs along the ski slope for supplying several snow-making devices. A manual valve 9 (called air valve 9) allows an operator to supply the fluidic air pipe 4 from the main air pipe A, or to stop this supply. The air pressure in the fluidic air pipe 4 can be between 1 bar and 10 bar; and the air flow rate can be between entre 5 $Nm^3$/h and 500 $Nm^3$/h.

The operating principle of the power generator 6 is to transform the kinetic/mechanical energy of air into electrical energy.

Herein, the compressed air circulates around the blades of the turbine 61 generating the rotational movement thereof.

The turbine 61 is rotationally driven by the flow of air. This rotation drives (via a shaft) an alternator that allows producing at least part of the electrical energy required for the good operation of the snow-making device 2.

The turbine 61 itself drives the associated alternator that converts the energy of the compressed air into electrical energy; and this electrical energy is regulated in a regulator device 10, then stored in energy storage means 10a.

The energy storage means 10a for storing the electrical energy produced can consist of conventional batteries or super-capacitors.

These energy storage means 10a are charged in parallel in such a way that the power supply begins as soon as the turbine 61 is in motion. Preferably, they have the ability to temporarily provide an electrical energy higher than that delivered by the turbine, which allows for example piloting an higher-power actuator.

In practice, the regulator device 10 consists of a regulation card potentially integrating the energy storage means 10a. This regulation card can be integrated into a case associated with the power generator.

This electrical energy allows supplying the control means 5 necessary for the management of the operation of the snow-making device 2.

These control means 5 here comprise a control/command automaton 51 that ensures the power supply, a set of sensors 11, a set of actuators (not shown), a radio modem or a communication system 12 with an external monitoring (computer, mobile application . . . ), a display-man/machine interface 13.

The set of sensors 11 can include:
an air pressure sensor 111,
a water pressure sensor 112,
an anemometer 113,
an ambient air temperature and humidity sensor 114.

The water valve 8 and the air valve 9 can be equipped with actuators and piloted by the electricity produced.

In this case, it is hence possible to adapt the flow rate of the snow-making device 2 at ambient temperature, and to stop it in case of emergency or if this ambient temperature no longer allows the production of snow.

The compressed air at the exit of the turbine 61 supplies the air circuit of the snow-making device 2. Two condensate draining systems 14 and 15 placed upstream and downstream, respectively, from the power generator 6, are adapted to limit the accumulation of water in said power generator 6 and, more particularly, in the turbine 61. These condensate draining systems 14 and 15 can be of the manual type (manual valve) or of the automatic type (pop-up drain).

The water circuit 3 is connected directly to the water circuit of the snow-making device 2.

The control/command automaton 51 controls of the water and air flow rates of the snow-making device 2 thanks to actuators piloting, for example, variable geometry nozzles, valves or dispensers as a function of certain at least of the following physical parameters:
air pressure detected by sensor 111,
water pressure detected by sensor 112,
wind speed and direction detected by sensor 113,
ambient air temperature and humidity detected by sensor 114.

The man/machine interface 13 can be optional and is made by a display associated with a communication connection of the wireless or wire type towards a monitoring (computer, mobile application, WEB application . . . ).

Operating Modes:

Such a facility may be implemented in three ways: automatic, self-regulating and manual mode.

1—Automatic Mode:

The energy stored in the batteries or the super-capacitors is sufficient to supply the sensors 11 and to allow the opening of the air valve 9.

In this case, if the ambient temperature is lower than a programmed threshold, the automaton 51 commands the opening of the air valve 9.

The power generator 6 then generates electricity that allows opening the water valve 8 and regulating the flow rate of the snow-making device 2 by piloting the actuators necessary for the nozzles, valves or dispensers positioning.

When the ambient temperature becomes higher than the above-mentioned programmed threshold, the automaton 51 closes back the water valve 8 then the air valve 9, and the system goes into standby mode, monitoring the ambient air temperature and the charge level of the batteries.

Messages can be sent, informing a remote computer means about the state of the system (sensor measurements, estimated flow rates, charge level of the energy storage means).

Alarm messages can be generated to signal abnormal or extreme situations as the charge level of the batteries which is too low to allow an automatic restart.

Optionally, if the batteries level becomes too low, the user can allow an automatic opening of the air valve 9 in the sole purpose of recharging the batteries if the network is loaded with air.

2—Self-Regulating Mode:

If the stored energy is insufficient or if the air valve 9 is not equipped with an actuator, the user opens manually the air valve 9 when he decides to operate the snow-making device 2.

The power generator 6 then generates electricity that allows opening the water valve 8 and regulating the flow rate of the snow-making device 2 by piloting the actuators necessary for the nozzles, valves or dispensers positioning.

As an alternative, if the water valve 8 in not equipped with an actuator, the user opens manually this water valve 8.

In both cases, when the ambient temperature is higher than the chosen threshold, a message is sent to the user and the snow-making device 2 is positioned to its minimum water flow rate.

3—Manual Mode:

In this manual mode, the user manually controls the snow-making device either via the operating panel of the automaton 51, or via switches.

The operator opens the air valve 9, either through the automaton 51, or manually if the charge level of the batteries does not allow it.

The power generator then generates the electricity necessary to the operation of the system and the potential recharge of the batteries.

Optionally, the automaton 51 and all or part of the elements may be supplied by an external source such as pre-charged portable appliance battery.

Figure 2:
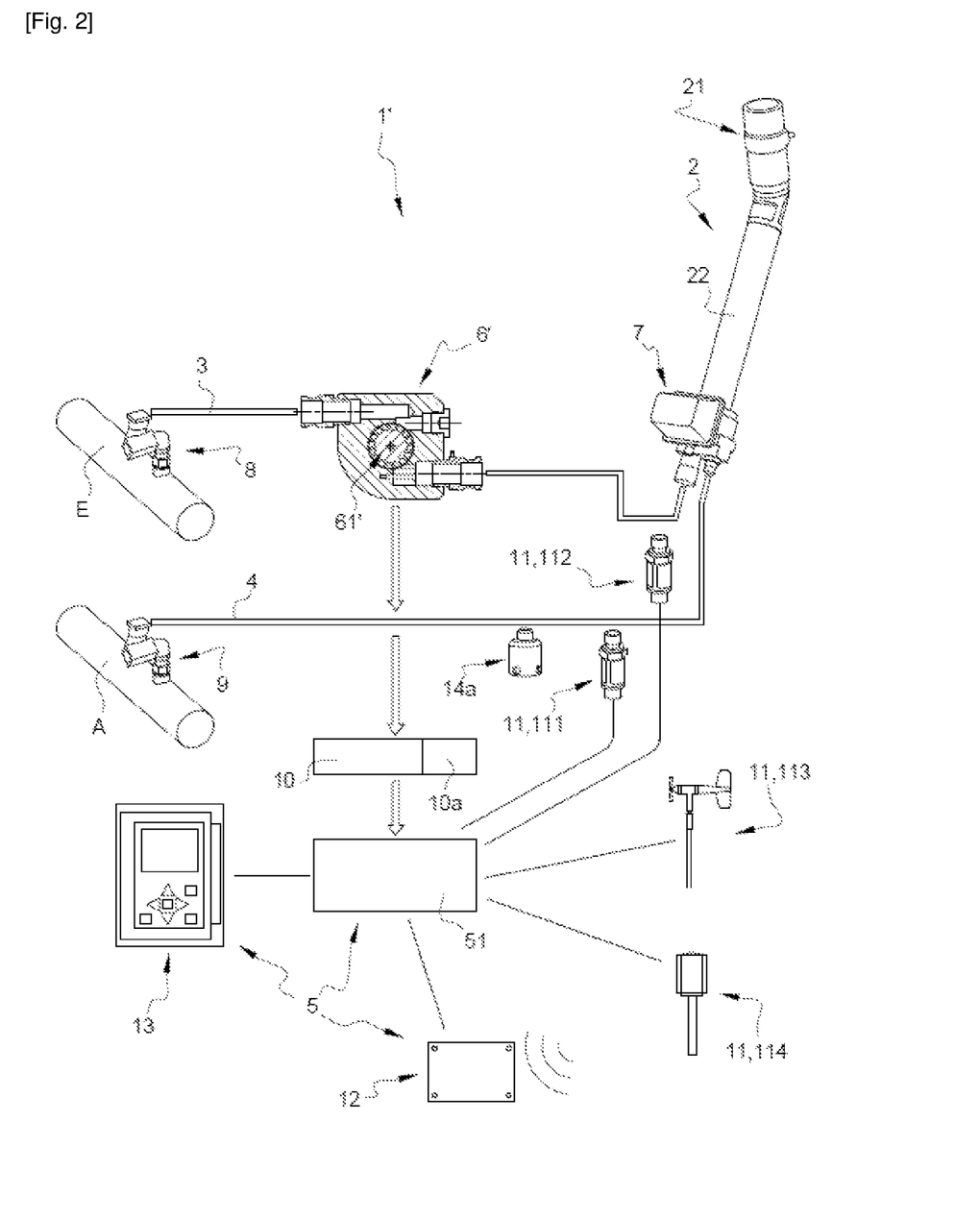
FIG. 2 is a general schematic view illustrating a second embodiment of an artificial snow-making facility according to the invention, comprising a power generator arranged on the fluidic water pipe that supplies the snow-making device.

FIG. 2 illustrates a second embodiment of an artificial snow-making facility 1' according to the invention.

The corresponding facility 1' comprises essentially the same components/devices as that described hereinabove in relation with FIG. 1 but, here, the power generator 6' is arranged on the fluidic water pipe 3.

This artificial snow-making facility 1' hence comprises:
a snow-making device 2,
a fluidic water pipe 3 (pressurized water) for supplying water to the snow-making device 2,
a fluidic air pipe 4 (compressed air) for supplying air to the snow-making device 2,
control means 5 for managing the operation of the snow-making device 2,
a power generator 6' for producing electricity and supplying electricity to the control means 5, this power generator 6' being here arranged on the fluidic water pipe 3, and comprising a blade turbine 61' adapted to be driven by the water fluid of said fluidic water pipe 3.

The snow-making device 2 may be of any type, in particular of the low- or high-pressure type.

In the illustrated embodiment, the snow-making device 2 is of the high-pressure type with external air/water mixture, provided with water spraying nozzles and at least one nucleation agent production nozzle.

The snow-making head 21 of the snow-making device 2 is mounted at the end of a pole 22 that may reach several meters high.

A case 7 enclosing the control means 5 is mounted at the base of the pole 22. The case 7 encloses in particular one or several dispensers actuated by motors (piston system) or by solenoid valves for the regulation of the snow-maker.

The fluidic water pipe 3 is connected to a main water pipe E that runs along the ski slope, preferably for supplying several snow-making devices. A manual valve 8 (called water valve 8) allows an operator to supply the fluidic water pipe 3 from the main water pipe E, or to stop this supply. The water pressure in the fluidic water pipe 3 can be between 3 bar and 100 bar; and the water flow rate can be between entre 0.1 m$^3$/h and 50 m$^3$/h.

Similarly, the fluidic air pipe 4 is connected to a main air pipe A that runs along the ski slope for supplying several snow-making devices. A manual valve 9 (called air valve 9) allows an operator to supply the fluidic air pipe 4 from the main air pipe A, or to stop this supply. The air pressure in the fluidic air pipe 4 can be between 1 bar and 10 bar; and the air flow rate can be between entre 5 Nm$^3$/h and 500 Nm$^3$/h.

The operating principle of the power generator 6' is to transform the kinetic/mechanical energy of air into electrical energy.

The turbine 61' is rotationally driven by the flow of water. This rotation drives (via a shaft) an alternator that allows producing at least part of the electrical energy required for the good operation of the snow-making device 2.

Herein, the pressurized water circulates around the blades of the turbine 61' generating the rotational movement thereof.

The turbine 61' itself drives the associated alternator that converts the energy of the pressurized water into electrical energy; and this electrical energy is regulated in a regulator device 10, then stored in energy storage means 10a.

The energy storage means 10a of the electrical energy produced can consist of conventional batteries or super-capacitors.

These energy storage means 10a are charged in parallel in such a way that the power supply begins as soon as the turbine 61' is in motion. Preferably, they have the ability to temporarily provide an electrical energy higher than that delivered by the turbine, which allows for example piloting an higher-power actuator.

In practice, the regulator device 10 consists of a regulation card potentially integrating the energy storage means 10a. This regulation card can be integrated into a case associated with the power generator.

This electrical energy allows supplying the control means 5 necessary for the management of the operation of the snow-making device 2.

These control means 5 here comprise a control/command automaton 51 that ensures the power supply, a set of sensors 11, a set of actuators (not shown), a radio modem or a communication system 12 with an external monitoring (computer, mobile application . . . ), a display-man/machine interface 13.

The set of sensors 11 can include:
an air pressure sensor 111,
a water pressure sensor 112,
an anemometer 113,
an ambient air temperature and humidity sensor 114.

The water valve 8 and the air valve 9 can be equipped with actuators and piloted by the electricity produced.

It is hence possible to adapt the flow rate of the snow-making device 2 at ambient temperature, and to stop it in case of emergency or if this ambient temperature no longer allows the production of snow.

The water at the exit of the turbine 61' supplies the water circuit of the snow-making device 2. A condensate draining system 14a is placed on the fluidic air pipe 4 to limit the accumulation of water in the snow-making device 2. This condensate draining system 14a can be of the manual type (manual valve) or of the automatic type (pop-up drain).

The compressed air circuit 4 is connected directly to the air circuit of the snow-making device 2.

The control/command automaton 51 controls of the water and air flow rates of the snow-making device 2 thanks to actuators piloting, for example, variable geometry nozzles, valves or dispensers as a function of certain at least of the following physical parameters:
air pressure detected by sensor 111,
water pressure detected by sensor 112,
wind speed and direction detected by sensor 113,
ambient air temperature and humidity detected by sensor 114.

The man/machine interface 13 can be optional and is made by a display associated with a communication connection of the wireless or wire type towards a monitoring (computer, mobile application, WEB application . . . ).

Operating Modes

The operating modes of this artificial snow-making facility 1' are similar to those described hereinabove in relation with the facility 1 of FIG. 1, with the following differences:

1—Automatic Mode:

The energy stored in the batteries or the super-capacitors is sufficient to supply the sensors 11 and allow the opening of the air valve 9 and the water valve 8.

In this case, if the ambient temperature is lower than a programmed threshold, the automaton 51 commands the opening of the air valve 9 then of the water valve 8.

The power generator 6' then generates electricity that allows regulating the flow rate of the snow-making device 2 by piloting the actuators necessary for the nozzles, valves or dispensers positioning.

If the batteries level becomes too low, it is not possible to recharge them because this would imply an attempt of producing snow out of temperature.

2—Self-Regulating Mode:

If the stored energy is insufficient or if the air 9 or water 8 valves are not equipped with an actuator, the user opens manually the air valve 9 when he decides to operate the snow-making device, then the water valve 8.

The power generator 6' then generates electricity that allows regulating the flow rate of the snow-making device 2 by piloting the actuators necessary for the nozzles, valves or dispensers positioning.

3—Manual Mode:

In this manual mode, the user manually controls the snow-making device 2, either via the automaton 51, or via switches.

The operator opens the air valve 9, either through the automaton 51, or manually if the charge level of the batteries does not allow it, then the water valve 8.

Figure 3:
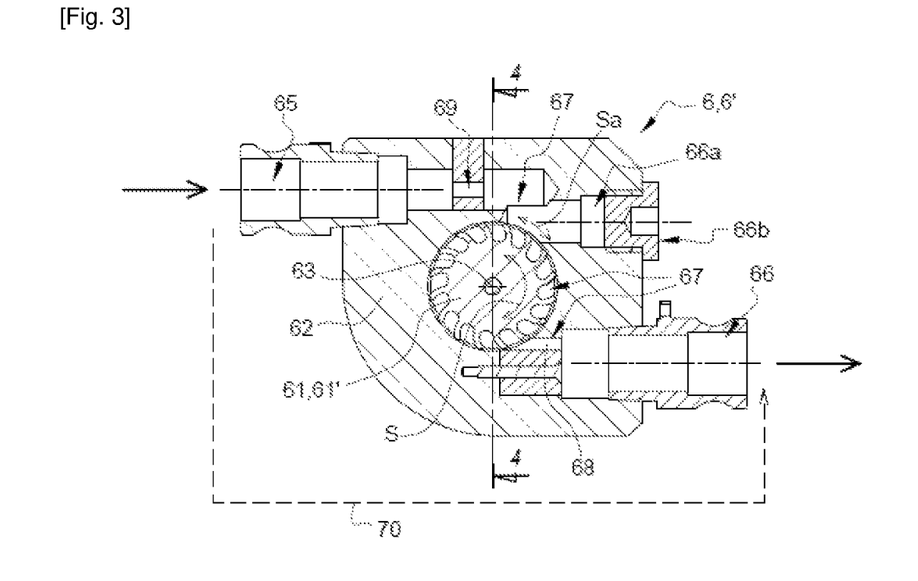
FIG. 3 is an isolated schematic view of the power generator of the artificial snow-making facilities illustrated in FIGS. 1 and 2, viewed in longitudinal cross-section at the turbine thereof.
Figure 4:
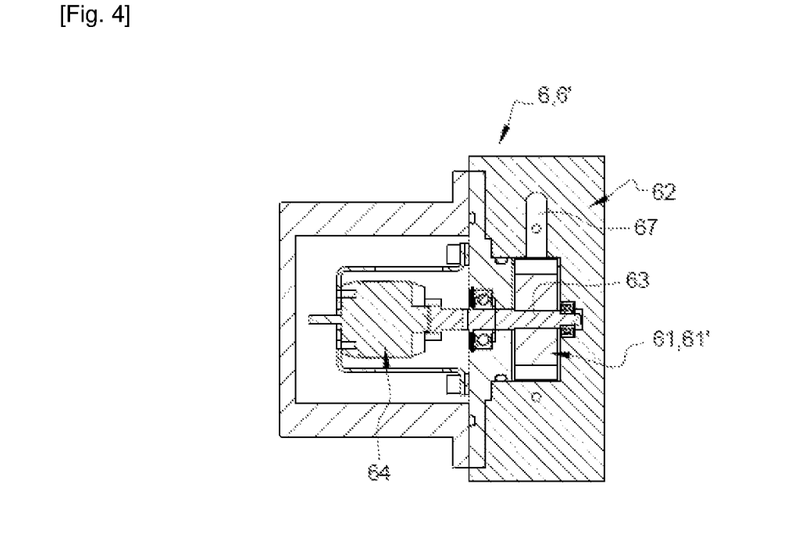
FIG. 4 is a cross-sectional schematic view of the power generator, taken along the sectional plane 4-4 of FIG. 3.

FIGS. 3 and 4 detail the structure of a power generator 6, 6' adapted to equip the artificial snow-making facilities 1, 1' of FIGS. 1 and 2.

This power generator 6, 6' comprises a blade turbine 61, 61', housed in a generator body 62.

The axis or shaft 63 of the turbine 61, 61' is meshed with an alternator 64 for the production of electricity. This alternator 64 is intended to be connected to the regulator device 10 and to the batteries or super-capacitors of the means 10a for storing the electrical energy produced.

As can be seen in FIG. 3, the power generator 6, 6' comprises a fluid inlet 65 for the driving fluid (air or water, according to the case) of the turbine 61, 61', as well as a fluid outlet 66 with, between both, a fluid transport canal 67. The fluid transport canal 67 connects the fluid inlet 65 and the fluid outlet 66; and a sector S of the turbine 61, 61' is arranged within a section of the transport canal 67 to allow the rotational driving thereof. Here, the sector S of the turbine that is arranged in the fluid transport canal 67 is of the order of 180°.

According to the characteristics of the snow-making facility, the fluid flow rate or speed can be adapted by at least one cross-section restriction, in particular to ensure the rotation of the turbine 61, 61' at an optimal speed.

Hence, such a passage restriction means 68 for the fluid can be provided downstream from the turbine 61, 61' (i.e. at the turbine exit), to limit the speed of the fluid in the fluid transport canal 67. Such a passage restriction 68 may be particularly interesting on air, to limit the speed if the turbine is used alone, without a snow-making device.

Likewise, at the entry (i.e. upstream from the turbine 61, 61'), according to the needs, a passage restriction means 69 may be usefully placed in such a way as to increase the speed of the fluid and to bring the fluid flow rate at a sufficient peripheral speed to rotate the turbine 61, 61' (the speed is increased by creating a pressure loss in order to guarantee a minimum rotation speed at low pressure).

The turbine 61, 61' of the power generator 6, 6' may be associated with only one of these passage restriction means 68, 69, or with the two upstream and downstream passage restriction means 68, 69.

The passage restriction means 68, 69 preferably each consist of a removable part, to allow it to be removed or replaced in order to adjust at will the desired flow rates and speeds. Such an adjustment can be obtained by a particular hole diameter, a particular hole shape or also a particular number of holes.

As schematically illustrated in FIG. 3, the artificial snow-making facility can include a "by-pass" pipe 70 that connects the fluid inlet 65 to the fluid outlet 66. It is to be understood that such a "by-pass" pipe 70 allows the passage of a part of the fluid (water or air, according to the case) for supplying the snow-making device 2 without transiting through the power generator 6, 6'. This makes it possible not to use only a part of the energy of the fluid for the turbine, in case of source of high energy, in order not to be forced to oversize the components of the turbine.

Still in FIG. 3, it can be observed that the power generator 6, 6' can comprise an additional outlet 66a for the driving fluid of the turbine 61, 61'.

That way:
- a first outlet 66 for the fluid is arranged in such a way that a first sector S of the turbine 61, 61' is arranged between a section of the transport canal 67, and
- a second outlet 66a for said fluid is arranged in such a way that a second sector Sa of the turbine 61, 61', different from S, is arranged within a section of said fluid transport canal 67.

Hence, the user has a choice to connect the snow-making device 2 to either the outlets 66 or 66a of the power generator 6, 6', in particular as a function of the fluid pressure and flow rate characteristics upstream from said power generator 6, 6'.

A plug closure means 66b is provided to close the first outlet 66 or the second outlet 66a not used for the connection.

Similarly, more than two outlets for the driving fluid of the turbine 61, 61' can be contemplated to increase the choice of connection as a function of the fluid pressure and flow rate characteristics upstream from the power generator 6, 6'.

According to the case, the power generator 6, 6' is adapted in such a way as its turbine 61, 61' resists to the operating air or water pressure. Its energy efficiency must be interesting and it must preferably minimize the energy taken from the air or water flow under penalty of significant performance degradation of the snow-making device 2.

This power generator 6, 6' is also preferably adapted to minimize the warming of the water or air flow. Indeed, the transformation of kinetic/mechanical energy into electrical energy causes a warming of the water or air flow linked to the friction of water or air on the blades of the turbine 61, 61'. The water or air temperature is an important parameter for the performances of the snow-making device 2, and a too high water or air temperature would cause a significant degradation of the performance of the snow-making device 2.

The snow-making facility is also advantageously equipped with any device necessary for the protection of persons.

According to an alternative embodiment, if required by the energy needs, the artificial snow-making facility may comprise a power generator arranged on the fluidic water pipe 3, and a power generator arranged on the fluidic air pipe.

It is to be noted that certain types of snow-makers comprise no air supply, the power generator being then necessarily arranged on the water supply.

Of course, various other modifications may be made to the invention within the scope of the appended claims.

The invention claimed is:

1. An artificial snow-making facility comprising:
   a snow-making device;
   a fluidic water pipe configured to supply water to said snow-making device;
   a fluidic air pipe configured to supply air to said snow-making device;
   a control means for managing operation of said snow-making device;
   a power supply configured to supply electricity to said control means, said power supply comprising a power generator arranged on said fluidic air pipe, said power generator comprising a turbine adapted to be driven by the air supplied by said fluidic air pipe; and
   an upstream condensate draining system placed upstream from the power generator and a downstream condensate draining system placed downstream from the power generator, the upstream condensate draining system and the downstream condensate draining system each being configured to limit accumulation of water in said power generator, the downstream condensate draining system being configured to remove condensate from the fluidic air pipe between the power generator and the snow-making device so that the condensate removed from the fluidic air pipe is not delivered to the snow-making device.

2. The artificial snow-making facility according to claim 1, wherein an axis of said turbine is meshed with an alternator configured to produce electricity, said alternator being connected to means for storing the electrical energy produced.

3. The artificial snow-making facility according to claim 1, further comprising a regulator device adapted to regulate electrical energy that is produced.

4. The artificial snow-making facility according to claim 1, wherein said control means comprises at least one sensor of at least one parameter selected from the group consisting of wind speed, water pressure, air pressure, ambient temperature, and ambient humidity, said at least one sensor being supplied with electrical energy produced by said power generator.

5. The artificial snow-making facility according to claim 1, wherein said power generator comprises:
- a fluid inlet for the air for driving said turbine;
- at least one fluid outlet for the air; and
- a transport canal for said air, connecting said fluid inlet and said at least one fluid outlet, a sector of said turbine being arranged within a section of the fluid transport canal and configured so as to allow rotational driving thereof,
- said fluid transport canal comprising a passage restriction means for said air, arranged upstream from said turbine, to increase a speed of said air in said fluid transport canal.

6. The artificial snow-making facility according to claim 1, wherein said power generator comprises:
- a fluid inlet for the air for driving said turbine;
- at least one fluid outlet for the air; and
- a transport canal for said air, connecting said fluid inlet and said at least one fluid outlet, a sector of said turbine being arranged within a section of the fluid transport canal and configured so as to allow rotational driving thereof,
- said fluid transport canal comprising a passage restriction means for said air, arranged downstream from said turbine, to limit a speed of the air in the fluid transport canal of the power generator.

7. The artificial snow-making facility according to claim 1, wherein said power generator comprises:
- a fluid inlet for the air for driving said turbine;
- at least one fluid outlet for the air; and
- a transport canal for said air, connecting said fluid inlet and said at least one fluid outlet, a sector of said turbine being arranged within a section of the fluid transport canal and configured so as, to allow rotational driving thereof,
- the artificial snow-making facility further comprising a bypass pipe that connects said fluid inlet to said at least one fluid outlet, said bypass pipe allowing passage of a portion of said air to supply said snow-making device without passing through said power generator.

8. The artificial snow-making facility according to claim 1, wherein said power generator comprises:
- an inlet for the air for driving said turbine;
- two outlets for the air;
- a transport canal for said air, connecting said inlet and said two outlets;
- a first outlet of said two outlets for the air being arranged in such a way that a first sector of said turbine is arranged within a section of said transport canal; and
- a second outlet of said two outlets for the air being arranged in such a way that a second sector of said turbine is arranged within a section of said transport canal,
- said first sector and second sector extending over angular sectors of different values to offer a choice of connection as a function of fluid pressure and flow rate characteristics upstream from said power generator,
- the artificial snow-making facility also comprising a closing means adapted to close either of said first outlet or said second outlet that is not used for connection.

9. The artificial snow-making facility of claim 2, wherein the means for storing the electrical energy produced comprises at least one of batteries and super-capacitors.

\* \* \* \* \*